United States Patent [19]

Reishus

[11] Patent Number: 4,557,435
[45] Date of Patent: Dec. 10, 1985

[54] MAGNETIC TAPE TENSION SENSOR

[75] Inventor: Terry Reishus, Broomfield, Colo.

[73] Assignee: Storage Technology Corporation, Louisville, Colo.

[21] Appl. No.: 445,139

[22] Filed: Nov. 29, 1982

[51] Int. Cl.⁴ .................... G03B 1/04; G11B 15/32; B65H 59/38

[52] U.S. Cl. .................. 242/190; 242/75.52; 226/45; 250/559

[58] Field of Search ............ 242/75.52, 182, 188–190, 242/57; 226/20, 45, 109, 196; 250/559–561; 360/71, 74.3, 74.6; 200/61.18

[56] References Cited

U.S. PATENT DOCUMENTS

| | | | |
|---|---|---|---|
| 3,244,954 | 4/1966 | Branco | 318/7 |
| 3,437,279 | 4/1969 | Rouland et al. | 242/189 X |
| 3,470,382 | 9/1969 | Tobey | 250/559 |
| 3,547,369 | 12/1970 | Potucek | 242/75.52 |
| 3,731,890 | 5/1973 | Ruoff et al. | 242/188 |
| 3,779,481 | 12/1973 | Wilson | 242/182 |
| 3,941,332 | 3/1976 | Matula | 242/75.52 |
| 4,313,551 | 2/1982 | Umehara | 226/196 |

Primary Examiner—Leonard D. Christian
Attorney, Agent, or Firm—Ronald C. Williams; James R. Young

[57] ABSTRACT

A tape tension sensor unit comprised of a light source; a light detector; a rotating arm member having disposed thereon a plurality of reflecting surfaces. When the tape is in a non-tensioned state, gravity rotates the arm to a downward position such that an incident light beam is reflected by a plurality of surfaces to the light detecting source, such that when that tape is in a tensioned condition, the tape rotates the arm to an upward position, causing the reflected light to be misaligned and not be incident on the detector. The appropriate logic circuit is connected to the light sensor such that the condition of a tape is sensed and the appropriate command for the tape drives motors is given.

5 Claims, 2 Drawing Figures

MAGNETIC TAPE TENSION SENSOR

BACKGROUND OF THE INVENTION

The present invention, a magnetic tape tension sensor, relates to the field of sensing devices, and in particular to the field of tape position and sensing devices as used in magnetic tape drive units.

In modern magnetic tape transport systems, the ability to sense the presence of tape tension during reel-to-reel operation is necessary to prevent uneven winding and damage to the tape media. In the prior art, it is well known to use mechanical switching devices to sense the tape tension, using the signal generated to operate the reels. Because of the varying position of the recording media, design parameters have acquired a relatively low force to operate the sensing mechanism which comes in contact with the tape media. This problem is compounded by the fact that the response of mechanical switches is non-linear with the operating force three to four times that of the release force, such that at the low tension levels necessary to prevent tape damage, the force generated by the tape tension causing the switch to be activated may be so low that the internal friction of the tension sensor assembly itself may be larger than the return force generated by the switch, thus causing the switch to remain in a closed position. The disclosed invention overcomes this problem by using an light switch having an arm which is pulled by gravity into an open position when not in contact with tape in a tensioned condition. In the open position, the light from the LED is twice reflected completing the light path back to the optical switch providing a signal to the appropriate circuit. When the tape is in a tensioned condition, the tape rotates the arm into a position such that the light beam is deflected causing the light path to be broken. However, when the tape is in an untensioned condition, gravity pulls the arm downward, again completing the light path.

In the prior art, it is known to use the interuption of a optical beam as a sensing device. See e.g., U.S. Pat. No. 3,800,162, dated Mar. 26, 1974, issued to Lueck et al, wherein an apparatus is disclosed for sensing the tension in a plurality of filaments. In Lueck, an unbalanced mass sufficient to deflect the filament a given amount is suspended between two independent light sources and detectors. Should the tension in the filament be greater or less than the specified amount, the detector arm swings into the light path, interupting same. One disadvantage with this prior art, is that the detector arm must remain in constant contact with the filament. The disclosed invention overcomes this problem by only contacting the tape when the tape is in a tensioned condition, having a restaining means to prevent the arm from moving into the tape path when the tape drive unit is in an operating mode other than reel to reel. The disclosed invention, when placed in a tape drive unit having severe space limitations, can sense tape tension in less than 0.050 inches of deflection.

It is an object of this invention to provide a means for sensing the tape tension in a magnetic tape drive unit.

It is yet another object of this invention to provide a low force means for sensing the tape tension in a magnetic tape drive unit.

It is still yet another object of this invention to provide a means for holding the tape away from the edge of the magnetic head in a magnetic tape drive unit when said unit is operating in a reel-to-reel mode.

SUMMARY OF THE INVENTION

In the preferred embodiment of the disclosed invention, the tape tension sensor is located adjacent to the read/write head. The sensor apparatus is comprised of: a narrow beam light source, which provides a beam to be detected when the tape is in a non-tensioned condition; a light detection means, deposed such that it will sense a narrow light beam when said light beam is properly directed thereonto; an arm, said arm pivotably attached such that when the tape is in a tension condition, the tape rotates the arm upward, and said arm having two reflective surfaces such that incoming narrow beam is doubly reflected back onto the light detecting means, and such that when the tape is in an untensioned condition, gravity rotates the arm downward such that the light reflected by the arm becomes incident upon the light detecting means thus completing the optical path. In operation, when the tape drive unit is in a reel-to-reel operating mode, the tape is tensioned and in doing so contacts and rotates upward the pivoting arm member. The upward rotation of the arm is restrained by a first restraining block positioned so that the narrow beam of light emmitting from the light source becomes misaligned, preventing completion of the optical path. In this upward rotated position, the arm also acts to prevent the tape from coming in contact with the edge of the magnetic head such that contamination is picked up by the tape as it passes through the unit.

When the tape is in the read/write mode, or in the rapid rewind mode, the tape is pulled by a vacuum down into the vacuum column such that it is pulled away from the pivoting arm member. In order to prevent the arm from rotating completely downward and into the path of the tape during either mode of operation, a second restraining block is located opposite the first block. The second block thererby prevents the continued downward movement of the pivoting arm member, stopping it such that the arm is positioned such that the narrow beam of light emitting from the light source is incident upon the first reflecting surface of the arm, reflected onto the second reflecting surface on the arm, and thereafter directly into the light sensing beam. Thus, the two restraining blocks cooperate to provide a limited travel for the pivoting member, allowing it to selectively be engaged by the tape during the reel-to-reel operation yet keeping the pivoting arm member out of the tape path during non reel-to-reel operations.

DETAILED DESCRIPTION OF THE PREFERRED EMBODIMENT

Figure 1:
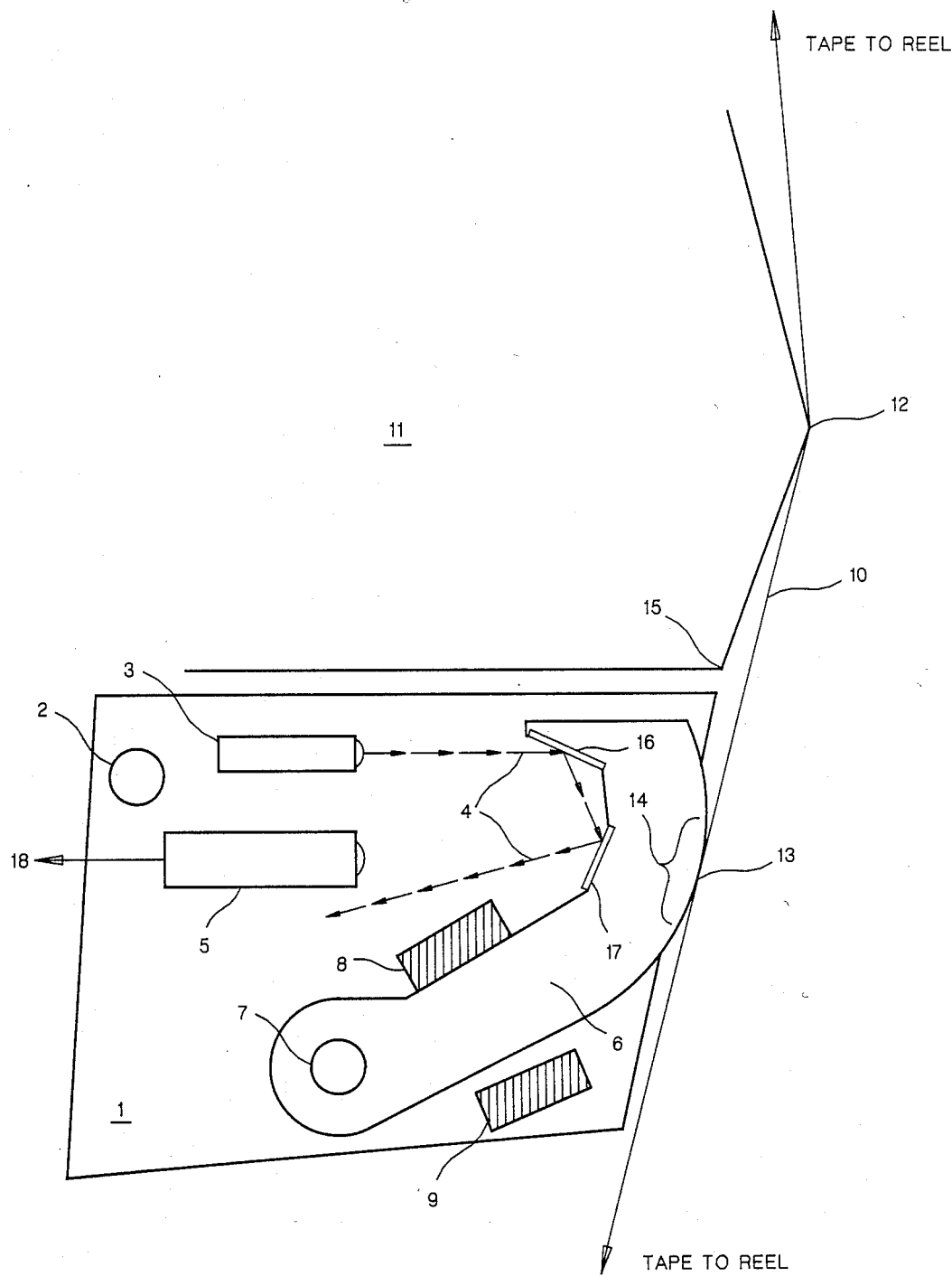
FIG. 1 is a schematic representation of the disclosed invention during reel-to-reel operation of a tape drive unit.
Figure 2:
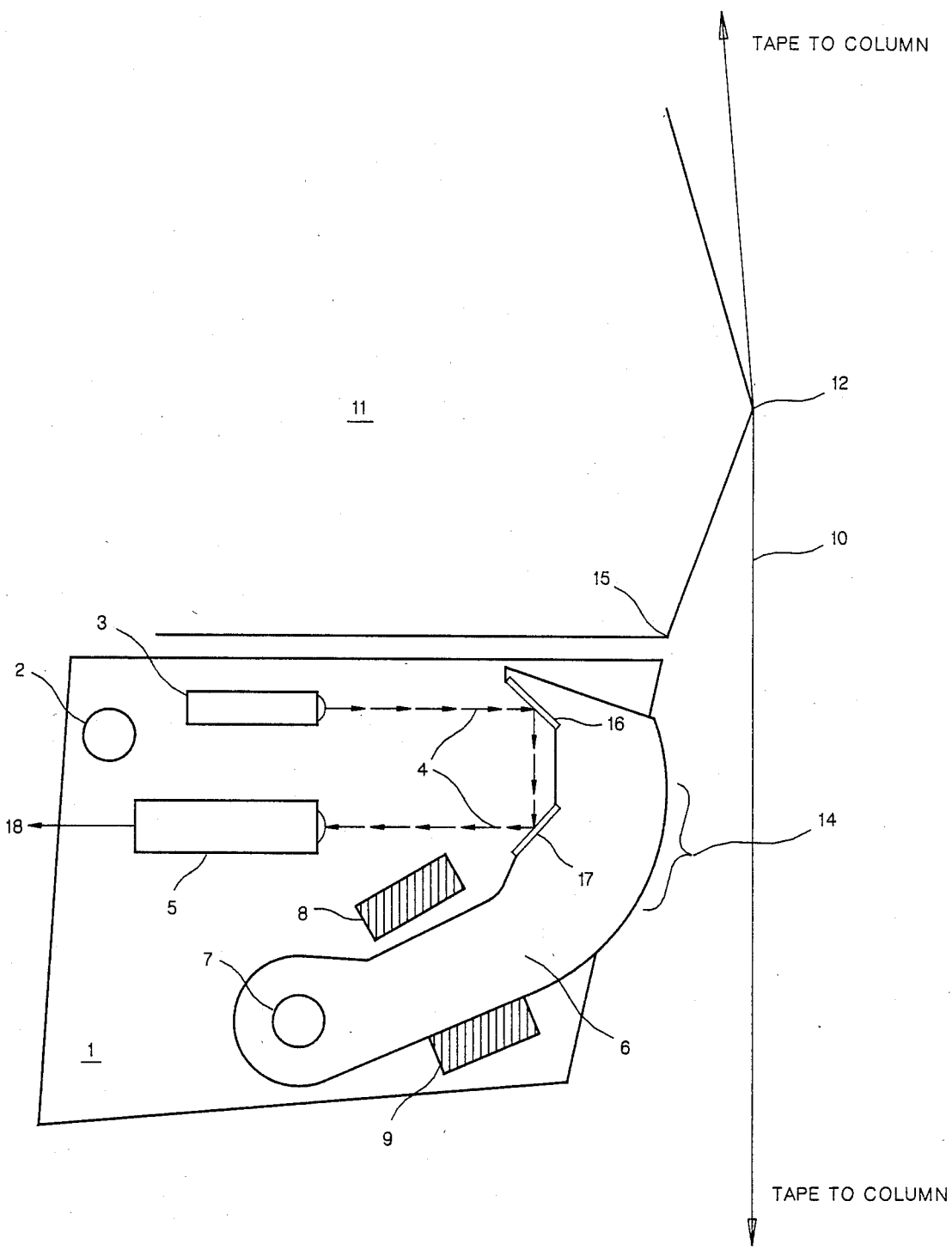
FIG. 2 is a schematic representation of the disclosed invention when the tape drive unit is in the read/write mode.

As shown in FIGS. 1 and 2, the tape tension sensor unit 1 is attached to the frame of the tape drive unit through opening 2 for that purpose. The sensor unit 1 consists of a narrow beam light source 3, said source 3 of any type well-known in the art, issuing a narrow light beam 4; a light detector 5, again of any type well-known in the art, disposed so as to receive the doubly reflected light beam 4; a rotatably mounted arm 6, mounted to said sensor unit 1 through hole 7 for that purpose; a first restraining block 8, for limiting the counter clockwise upward rotation of the arm 6; and a second restraining block 9, for limiting the clockwise downward rotation of the pivoting arm 6.

In reel-to-reel operation, as shown in FIG. 1, the magnetic tape 10 is tensioned and is in contact with the magnetic head 11 at point 12, and with the arm at point 13. The tensioned tape 10 has caused the arm 6 to have rotated to an upward position, said arm 6 restrained by block 8. In the preferred embodiment, the outer surface 14 of member 6 is a polished metalized surface such that as the tape rides over this surface, minimal wear will result on surface 14 or on the tape 10. Block 8 is positioned such that when the arm 6 is in the fully upward position, the tape will not contact edge 15 of the magnetic recording head 11.

As shown in FIG. 2, when the tape 10 passes through the vacuum column of the tape drive unit (not shown), such as when the tape drive unit is in the read/write mode, the orientation of the arm 6 allows gravity to rotate the arm 6 in a counterclockwise, downward, direction. As shown in FIG. 2, the arm 6 is kept out of the tape 10 path by the second restraining block 9.

As shown in FIG. 1, when the arm 6 is in the upward position, the beam 4 is incident upon the first reflecting surface 16 said reflecting surface reflecting the beam downward to a second reflecting surface 17 thereafter, the doubly reflected beam 4, being misaimed, does not arrive at detector 5, to complete the optical path. However, as shown in FIG. 2, when the tape is in the vacuum column, and not in contact with the arm 6, the downward location of the arm 6, alters the path the beam 4 follows, such that upon reflection at surfaces 16 and 17, beam 4 becomes incident upon the light detector 5, thereby completing the optical path wherein a signal 18 is generated which is set to the appropriate tape drive logic circuit (not shown) for operation of the reel drive motors (not shown).

I claim:

1. A tape tension sensor unit for a magnetic tape drive of the type in which the magnetic tape is driven from reel to reel past a magnetic recording head, comprising:
    means for emitting a narrow beam of light;
    means for reflecting the incident light onto a light detecting means when the tape is in a non-tensioned condition comprising:
        a rotatably mounted arm, said arm having a generally reflective inner surface from which the light beam is reflected, and mounted such that when the tape is in a non-tensioned condition, gravity rotates the arm to a downward position wherein the light beam from the means for emitting a narrow beam of light is reflected into the light detector, but such that when the tape is tensioned, the tape rotates the arm upwardly causing the reflected light to be misaligned and not be incident upon the light detector, and;
    a light detector, for detecting light properly reflected onto said light detector.

2. A tape tension sensor unit as recited in claim 1, wherein said arm is further positioned so that when said arm is in the upward position the tape is held off the edge of the magnetic recording head during reel to reel operation.

3. A tape tension sensor unit as recited in claim 2, wherein the outer surface of said arm is a non-abrasive hardened surface.

4. A tape tension sensor unit of claim 3, wherein the pivoting arm has two reflecting surfaces such that when the arm is in a downward position, the incident light beam is doubly reflected and upon said second reflection is reflected back on a path parallel to the incident beam and into the light detector.

5. A tape tension sensor unit as recited in claim 4, wherein said arm is gravity actuated, said sensing unit further comprising a restraining block disposed on the lower side of said arm, said restraining block limiting the downward rotation of said arm, such that the arm is prevented from contacting the tape when said tape has been moved into contact with the magnetic recording head, and positioned such that when it restrains the arm in the downward position, the light is reflected into the detector.

* * * * *